US006817579B2

(12) United States Patent
van der Velden et al.

(10) Patent No.: US 6,817,579 B2
(45) Date of Patent: Nov. 16, 2004

(54) PASSENGER TRANSPORT MODULE SYSTEM FOR SUPERSONIC AIRCRAFT

(75) Inventors: Alexander van der Velden, Atlanta, GA (US); Holger Stockfleth, Lemwerder (DE)

(73) Assignee: Astrium GmbH, Ottobrunn (DE)

( * ) Notice: Subject to any disclaimer, the term of this patent is extended or adjusted under 35 U.S.C. 154(b) by 0 days.

(21) Appl. No.: 10/214,396

(22) Filed: Aug. 6, 2002

(65) Prior Publication Data

US 2003/0080250 A1 May 1, 2003

(30) Foreign Application Priority Data

Aug. 6, 2001 (DE) .......................................... 101 37 806

(51) Int. Cl.[7] ................................................. B64D 1/00
(52) U.S. Cl. ................................. 244/137.2; 244/118.5; 244/140
(58) Field of Search ...................... 244/2, 137.1, 137.2, 244/138 R, 139, 140

(56) References Cited

U.S. PATENT DOCUMENTS

| 3,218,005 | A | | 11/1965 | Calderón | |
|---|---|---|---|---|---|
| 3,227,399 | A | * | 1/1966 | Dastoli et al. ................... | 244/2 |
| 3,676,779 | A | * | 7/1972 | Faulring et al. ............. | 116/203 |
| 3,933,325 | A | * | 1/1976 | Kaelin ....................... | 244/23 C |
| 4,379,533 | A | * | 4/1983 | Caldwell et al. .......... | 244/118.1 |
| 4,387,866 | A | * | 6/1983 | Eickmann ..................... | 244/7 C |
| 4,452,412 | A | * | 6/1984 | von Pragenau .............. | 244/172 |
| 5,026,006 | A | * | 6/1991 | Tinder et al. .......... | 244/122 AG |
| 5,356,097 | A | * | 10/1994 | Chalupa ...................... | 244/139 |
| 5,568,903 | A | * | 10/1996 | Pena et al. .................... | 244/140 |
| 5,836,544 | A | * | 11/1998 | Gentile ..................... | 244/17.17 |
| 5,842,666 | A | * | 12/1998 | Gerhardt et al. .............. | 244/15 |
| 5,921,504 | A | * | 7/1999 | Elizondo ..................... | 244/140 |
| 5,992,794 | A | * | 11/1999 | Rotman et al. ........... | 244/17.17 |
| 6,213,427 | B1 | * | 4/2001 | Mareska ................... | 244/118.5 |
| 6,382,563 | B1 | * | 5/2002 | Chiu .......................... | 244/120 |

FOREIGN PATENT DOCUMENTS

EP         0202020 A1 * 11/1986   ............... 244/45 A

* cited by examiner

Primary Examiner—Jack Keith
Assistant Examiner—Gabriel S. Sukman
(74) Attorney, Agent, or Firm—W.F. Fasse; W.G. Fasse

(57) ABSTRACT

An autonomous passenger module is releasably carried on a super-sonic aircraft, such as a military fighter jet, for carrying plural passengers on supersonic and near space flights. The passenger module is equipped with passenger service and life support systems to provide oxygen and the like, a parachute system, and a landing airbag or flotation aid system. The module remains mounted on the aircraft throughout a normal flight. In an emergency situation, the module separates from the aircraft by means of releasable connector elements and descends using parachutes. The module provides high passenger capacity at a low cost in a simple manner for commercial supersonic flights using an existing supersonic aircraft as a carrier platform.

22 Claims, 2 Drawing Sheets

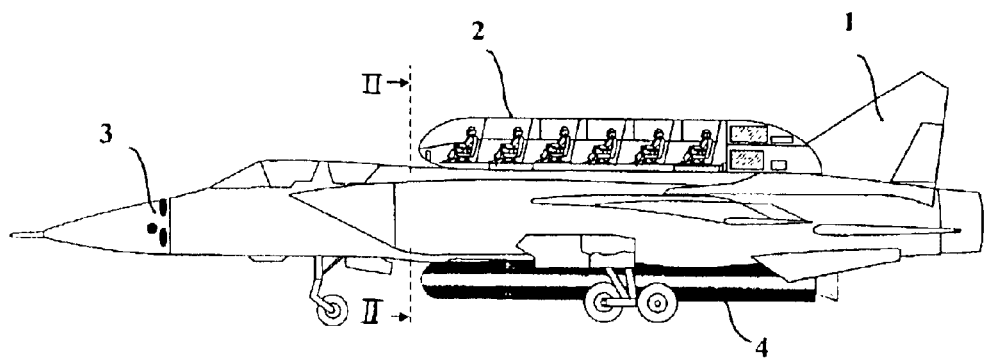
Fig. 1
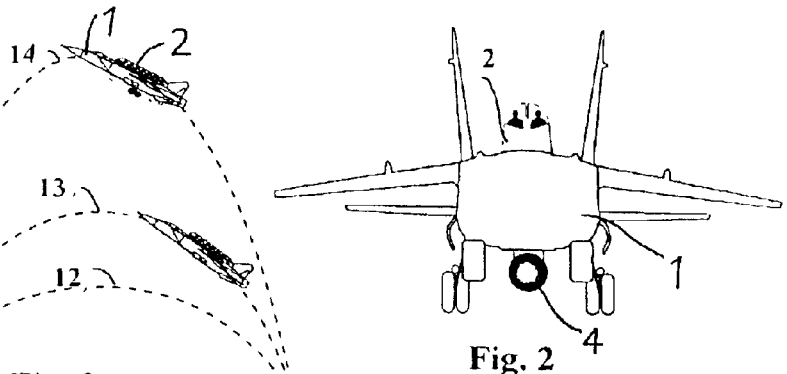
Fig. 3
Fig. 2
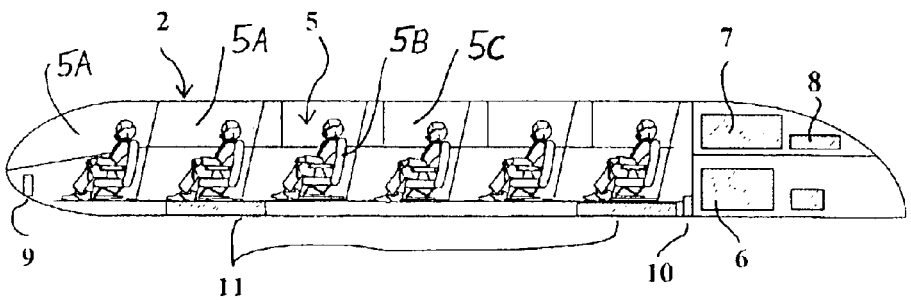
Fig. 4

PASSENGER TRANSPORT MODULE SYSTEM FOR SUPERSONIC AIRCRAFT

PRIORITY CLAIM

This application is based on and claims the priority under 35 U.S.C. §119 of German Patent Application 101 37 806.8, filed on Aug. 6, 2001, the entire disclosure of which is incorporated herein by reference.

FIELD OF THE INVENTION

The invention relates to a system for the supersonic transport of passengers and for passenger flights into near space using high performance supersonic aircraft.

BACKGROUND INFORMATION

It is already known, and a $15 million per year industry has developed, to utilize existing high performance supersonic aircraft (e.g. military fighter aircraft) for commercial applications, such as introducing the public to supersonic flight, high performance aerobatics, and high altitude flights to the lower boundary of space. Such civil commercial applications of existing supersonic military aircraft suffer several disadvantages and limitations. First, the per-passenger cost of such a flight is extremely high, because only a single passenger can be accommodated on board such an aircraft. Namely, such existing supersonic aircraft are typically equipped with a maximum of two seat positions in the cockpit, and the passenger is seated in the rear seat of the cockpit of the aircraft. Secondly, due to the backseat position, the passenger often has only an obstructed view and limited seating comfort in a rather cramped space. Thirdly, any passenger who is to undertake such a commercial supersonic flight in a decommissioned military aircraft or the like, must first be trained in various emergency procedures, including the use of an ejection seat to eject from the aircraft in case of an emergency. Even with such training, ejecting from the aircraft at a very high altitude and high speed is extremely hazardous at best.

A popular commercial application for existing military aircraft is a high altitude flight to the boundary of space, by carrying out a high speed pull-up. Such a pull-up flight maneuver can bring the existing aircraft to an altitude of approximately 25 km. Such a flight is dangerous and the maximum altitude is limited due to the diminishing controllability of the aircraft as the ambient air density becomes very small so that the control surfaces, and especially the rudder, lose efficiency. Also, the typical air-breathing jet engines are unable to continue providing the required thrust for maintaining flight at such an altitude.

SUMMARY OF THE INVENTION

In view of the above, it is an object of the invention to provide a system by which a greater number of passengers can be transported at supersonic speeds, for the purposes of travel, recreation, and tourism, whereby the cost and effort for such supersonic flight per passenger is reduced in comparison to the prior art. It is a further object of the invention to simplify and improve the safety of such supersonic flights for members of the public. Another object of the invention is to use existing supersonic aircraft as a propulsion unit or platform to be developed to carry a greater number of passengers. The invention further aims to avoid or overcome the disadvantages of the prior art and to achieve additional advantages, as apparent from the present specification.

The above objects have been achieved according to the invention in a passenger transport system including an autonomous passenger module mounted in the manner of a payload container or pod on a supersonic aircraft. The autonomous passenger module includes a multi-passenger cabin with comfortable passenger seats and passenger service features (e.g. similar to those that exist in present-day commercial passenger aircraft). The passenger cabin has relatively large windows, for example canopy-type windows in the manner of an overhead canopy with a full $\geq 180°$ overhead view similar to that of the pilot cockpit of the aircraft. The autonomous passenger module is further equipped with safety and life support systems, e.g. including an oxygen supply or oxygen generators, a power unit with a compressor or pressurized gas cylinders for maintaining a pressurized atmosphere within the passenger cabin, an electrical system for cabin lighting and the like, a communication system for communication between the passenger cabin and the aircraft or an earth-based ground station, etc.

The inventive system preferably uses a pre-existing supersonic aircraft, such as a military fighter-type aircraft, as the module carrying platform. The term "military fighter-type aircraft" means a decommissioned former military fighter aircraft (e.g. a Mig 31) or an aircraft of a design the same as a military fighter aircraft. Thereby, the commercial civil transport of an increased number of passengers can be achieved with little effort or complication, and with relatively low costs. It is not necessary to alter the existing supersonic aircraft, although the invention provides for preferable modifications or enhancements as described herein. The aircraft has a sufficient payload capacity to carry the additional passenger module in all phases of its ordinary flight envelope, including take-off, climb, cruise, descent and landing. The aircraft is also able to carry out its normal aerobatic maneuvers and the like while carrying the passenger module.

While the invention is primarily described herein in connection with a military fighter aircraft, the supersonic aircraft used as the payload carrier platform for the passenger module can alternatively be any other supersonic aircraft with a sufficient payload capacity. Generally, military fighter aircraft and other supersonic aircraft intended and suitable for use according to the invention have an inherent limited passenger capacity of one or two or three persons, i.e. a pilot plus one or two additional passengers. The use of the inventive system substantially increases the passenger carrying ability of the aircraft with a rather low additional cost and effort.

While the passenger module may remain permanently mounted on the aircraft to be carried by the aircraft throughout an entire normal flight as mentioned above, the invention also provides an improvement of the overall safety in case of an emergency, as follows. The passenger module is preferably releasably mounted on top of the aircraft by releasable mounting elements or separation elements, e.g. pyrotechnically explodable mounting bolts or latches or the like. The passenger module is further equipped with its own autonomous landing parachute system. Thus, in the event of an emergency, the passenger module is separated from the aircraft and the parachute system is deployed to safely carry the passenger module back down to earth, while the passengers remain safely seated in the passenger cabin with the benefit of the life support systems of the module, e.g. providing oxygen, pressurization, and temperature control. Thus, the passengers do not need to be trained for, and do not need to carry out an ejection in case of an emergency. Also, the passengers are not subjected to the dangerous effects of low pressure, low oxygen, and low temperature in the event of an emergency at very high altitudes, and are not subjected to the high G loads of ejection or emergency maneuvers of the aircraft. Depending on the size and the payload capacity of the supersonic aircraft, a different size of passenger module may be used. For some large powerful military jet aircraft, relatively large passenger modules, with seating for several passengers, are feasible. For example, the passenger module may have a single column of several passenger seats, or several rows of two abreast passenger seats, e.g. for a total passenger capacity of at least 4, or even 10 or 12 or more passengers in the passenger module. Of course, the total operating costs per passenger are scaled down in proportion to the size and seating capacity of the passenger module.

In order to improve the control, and thereby overcome the problem of diminishing controllability of the aircraft at high altitudes, the aircraft and/or the passenger module may additionally be equipped with thrusters along several axes to achieve enhanced attitude control at high altitudes in a thinning atmosphere. These thrusters may be similar to those used on most spacecraft. The addition of such thrusters on the aircraft can increase the operational altitude by as much as 10 km, e.g. to an altitude of about 35 km. This thruster attitude control system is also required to maintain the proper controlled attitude of the aircraft during the ballistic flight at high altitude. Furthermore, the maximum achievable altitude can be additionally increased to an altitude of at least 45 km or even approximately 50 km by equipping the aircraft and/or the passenger module with one or more booster rockets, which may be liquid or solid fuel boosters according to any conventional teachings. The rocket booster augmentation and thruster attitude control systems work in vacuum at high altitude and thereby improve and extend the flight envelope of the aircraft with the passenger module mounted thereon, to near space suborbital flights.

BRIEF DESCRIPTION OF THE DRAWINGS

In order that the invention may be clearly understood, it will now be described in connection with example embodiments, with reference to the accompanying drawings, wherein:

FIG. 1 is a schematic side view of a supersonic military fighter aircraft with a passenger module mounted thereon according to the invention;

FIG. 2 is a schematic cross-section along the line II—II of FIG. 1;

FIG. 3 is a schematic sketch showing representative flight paths or trajectories for the maximum achievable altitude with various different embodiments of control systems and auxiliary propulsion systems;

FIG. 4 is an enlarged schematic side view (broken or sectioned open) of a passenger module according to the invention.

Figure 5:
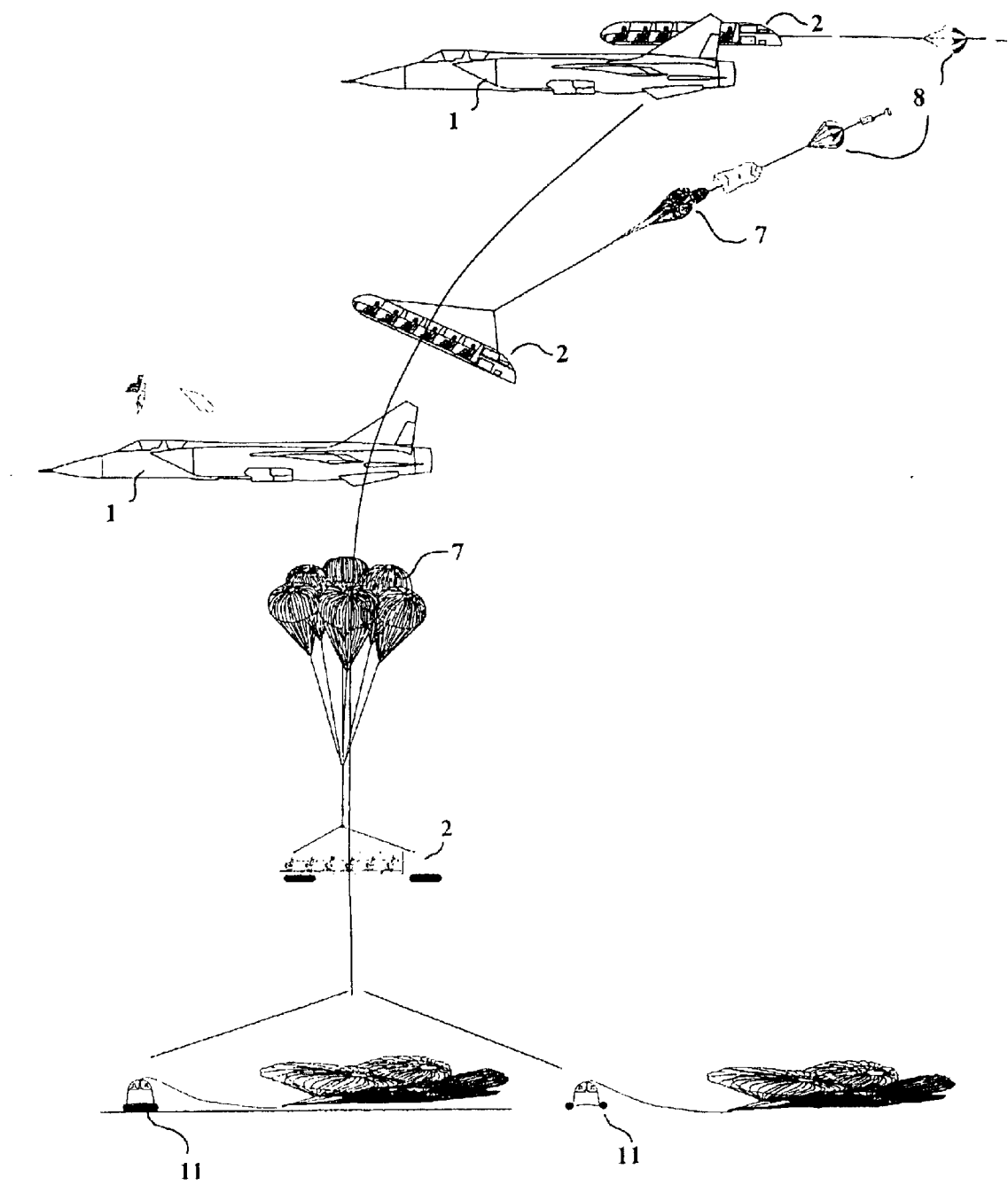
FIG. 5 schematically shows a sequence of stages of an emergency recovery of the passenger module.

DETAILED DESCRIPTION OF PREFERRED EXAMPLE EMBODIMENTS AND OF THE BEST MODE OF THE INVENTION

FIG. 1 schematically represents the overall system according to the invention, including a supersonic aircraft 1 of military fighter jet type, e.g. a decommissioned military fighter aircraft, and a passenger module 2 mounted on the top of the fuselage of the aircraft 1. Multi-axis attitude control thrusters 3 are provided at the front or on the nose of the aircraft 1. A liquid or solid fueled rocket booster 4 is mounted on the belly of the aircraft 1. The thrusters 3 and booster 4 are connected to suitable control devices for control from the cockpit of the aircraft 1, in any conventionally known manner.

As seen especially in the enlarged detail view of FIG. 4, the passenger module 2 includes a passenger cabin 5 preferably comprising a plurality of passenger compartments 5A, which may be enclosed and separated from one another, for example by partitions therebetween. Each passenger compartment 5A includes at least one passenger seat 5B and a large window 5C, for example in the manner of a cockpit canopy window. In the illustrated embodiment, the passenger module 2 includes six passenger compartments 5A, which each include two passenger seats arranged side-by-side, for a total passenger capacity of twelve persons.

The rear portion of the passenger module 2 houses various passenger service, life support, control and safety devices and systems. For example, a life support system 6 provides oxygen, a pressurized environment, and a controlled temperature in each one of the passenger compartments 5A. If the passenger compartments 5A are separated from one another, they can each independently be supplied with oxygen, a pressurized atmosphere, and temperature control. Instead of providing a pressurized oxygenated atmosphere within the passenger compartments 5A, it is alternatively possible merely to provide oxygen in a face mask for each passenger, and temperature regulation of the passenger compartments, while the passenger may additionally wear an exposure protection suit and/or a pressure suit. The life support system 6 includes any additional devices and arrangements, such as an electrical system, a communication system, and the like, to provide a safe and comfortable environment and operation of the passenger module 2. Thereby, the passenger module 2 is an autonomous module that maintains this safe and comfortable environment and operation on its own, completely separate from the carrier aircraft 1.

For enhanced safety, the passenger module 2 is further equipped with a parachute system including a main chute 7 and a drogue or auxiliary chute 8, which are also mounted in the rear portion of the module 2. To allow a parachute descent of the passenger module 2 separate from the aircraft 1 in the event of an emergency, the module 2 is preferably mounted on and secured to the aircraft 1 by separation systems 9 and 10, for example including pyrotechnic explodable bolts or latch elements. To improve the safety and comfort of a parachute landing of the passenger module 2 separate from the aircraft 1, an airbag and flotation system 11 is provided at the bottom of the module 2.

As shown in FIG. 3, the passenger module 2 remains mounted and is carried on the aircraft 1 throughout all phases of a normal flight. FIG. 3 shows three different possible flight paths or trajectories 12, 13 and 14 with respective different maximum altitudes, depending on the particular equipping of the aircraft 1. The lowest flight trajectory 12 represents the maximum altitude (e.g. approximately 25 km) that can be achieved using a conventional supersonic jet aircraft by carrying out a high speed pull-up maneuver. Such a conventional carrier aircraft is not equipped with attitude control thrusters or a booster rocket. With this lowest flight path 12, the aircraft 1 takes off and flies a normal climb flight to the lower edge of space. The second flight trajectory 13 represents the somewhat higher maximum altitude (e.g. 35 km) that can be achieved when the carrier aircraft 1 is additionally equipped with an attitude control thruster system 3, while the third flight path or trajectory 14 represents the maximum altitude (e.g. 50 km) that can be achieved when the carrier aircraft 1 is equipped with both an attitude control thruster system 3 and an auxiliary propulsion rocket booster 4. With the additional equipment for the flight paths 13 or 14, the present system can achieve near space suborbital flights.

As mentioned above, in normal operation, the passenger module 2 remains mounted on the aircraft 1 throughout take-off, flight and landing. In an emergency situation, however, it may be advantageous to release and separate the passenger module 2 from the aircraft 1, both for the safety of the passenger module 2 and the passengers therein, as well as for the safety of the aircraft 1 and its pilot. FIG. 5 schematically represents a sequence of stages of an emergency procedure for the separation and parachute supported descent of the passenger module 2.

If an emergency situation occurs, the pilot of the aircraft 1, or an automatic or radio controlled control system of the passenger module 2, can initiate the emergency procedure shown in FIG. 5. After the jet engine/engines is/are shut down, the drogue chute 8 is deployed from the passenger module 2, and the explosive charges of the separation elements 9 and 10 are discharged to separate the module 2 from the aircraft 1. The drogue chute 8 assists in separating the module 2 from the aircraft 1, and then in deploying the main parachute 7 from the module 2. Once the module 2 is separated clear of the aircraft 1, the pilot of the aircraft 1 can eject from the aircraft on his ejection seat. Alternatively, if the aircraft 1 remains flyable, but e.g. with reduced power or the like which required the passenger module 2 to be jettisoned, the pilot can continue to fly the aircraft 1 to safety. Meanwhile, the passenger module 2 will descend on the parachute system. At a high altitude, the deployment of the main parachute or parachutes 7 will be delayed. Namely, the passenger module 2 will first descend in the atmosphere with only the drogue chute 8 deployed, until the main parachute or parachutes 7 deploy at the appropriate altitude. Then, the passenger module 2 will continue to slowly descend through the atmosphere to the earth. To cushion the landing impact and to provide flotation in the event of a water landing, airbags or flotation devices are deployed from the corresponding system 11 of the passenger module 2.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A system for the supersonic transport of plural passengers comprising:
   a supersonic aircraft including a cockpit therein for a pilot to control said aircraft; and
   an autonomous passenger module mounted outside and on top of said aircraft higher than said cockpit and connected to said aircraft;
   wherein said autonomous passenger module includes a passenger cabin adapted to accommodate plural passengers therein, a passenger service and life support system to serve and support the passengers in said passenger cabin, and an aerodynamic nose that is frontally exposed above said aircraft; and
   wherein said autonomous passenger module does not include a jet propulsion engine adapted to propel said module in powered flight, does not include a pilot cockpit, and does not include powered-flight controls adapted to control a powered flight of said module or said aircraft.

2. The system according to claim 1, wherein said aircraft is a military fighter type jet aircraft.

3. The system according to claim 1, wherein said aircraft has a maximum occupancy capacity of three person. including the pilot inside said aircraft itself.

4. The system according to claim 1, further comprising attitude control thrusters provided on at least one of said aircraft and said passenger module.

5. The system according to claim 4, wherein said thrusters are provided on said aircraft.

6. The system according to claim 1, further comprising a thrust booster rocket provided on at least one of said aircraft and said passenger module.

7. The system according to claim 6, wherein said thrust booster rocket is provided on said aircraft.

8. The system according to claim 1, further comprising attitude control thrusters and a thrust booster rocket provided on said aircraft.

9. The system according to claim 1, further comprising pyrotechnically explodable connector elements that releasably connect said passenger module to said aircraft.

10. The system according to claim 1, wherein said passenger module further includes a parachute system with at least one parachute adapted to enable a parachute supported descent of said passenger module.

11. The system according to claim 10, further comprising releasable connector elements that releasably connect said passenger module to said aircraft, such that said passenger module can be separated from said aircraft by releasing said releasable connector elements and can descend separately from said aircraft supported from said at least one parachute.

12. The system according to claim 1, wherein said passenger module further includes at least one of selectively deployable landing airbags and selectively deployable flotation aids.

13. The system according to claim 1, wherein said passenger service and life support system includes an oxygen supply adapted to provide oxygen for the passengers in said passenger cabin.

14. The system according to claim 1, wherein said passenger service and life support system includes a pressurizing device to pressurize said passenger cabin.

15. The system according to claim 1, wherein said passenger service and life support system includes at least one of a heating device and a cooling device to control a temperature in said passenger cabin.

16. The system according to claim 1, wherein said passenger service and life support system includes an electrical power supply system.

17. The system according to claim 1, wherein said passenger service and life support system includes a radio communication system.

18. The system according to claim 1, wherein said passenger module further includes at least four passenger seats arranged in said passenger cabin to accommodate at least four passengers in said passenger cabin.

19. The system according to claim 1, wherein said passenger module further includes at least ten passenger seats arranged in said passenger cabin to accommodate at least ten passengers in said passenger cabin.

20. The system according to claim 1, wherein said passenger module further includes plural passenger seats arranged in plural two-abreast rows in said passenger cabin.

21. The system according to claim 1, wherein said passenger cabin is divided into plural separate passenger compartments, and further comprising at least one respective passenger seat arranged in each one of said passenger compartments.

22. The system according to claim 1, wherein said passenger module further includes canopy-type windows enclosing said passenger cabin.

* * * * *

UNITED STATES PATENT AND TRADEMARK OFFICE
CERTIFICATE OF CORRECTION

PATENT NO. : 6,817,579 B2
DATED : November 16, 2004
INVENTOR(S) : van der Velden et al.

It is certified that error appears in the above-identified patent and that said Letters Patent is hereby corrected as shown below:

<u>Column 5,</u>
Line 67, after "a", replace "let", by -- jet --.

<u>Column 6,</u>
Line 8, after "three", replace "person." by -- persons --.

Signed and Sealed this

First Day of March, 2005

JON W. DUDAS
*Director of the United States Patent and Trademark Office*